United States Patent [19]
Long

[11] Patent Number: 5,644,315
[45] Date of Patent: Jul. 1, 1997

[54] DOPPLER RATIO DETECTION RADAR WITH RANGE CFAR

[76] Inventor: Maurice W. Long, 1036 Somerset Dr. NW., Atlanta, Ga. 30327

[21] Appl. No.: 549,183

[22] Filed: Oct. 27, 1995

[51] Int. Cl.$^6$ .................. G01S 7/292; G01S 7/34
[52] U.S. Cl. .................. 342/93; 342/99; 342/101; 342/162; 342/203
[58] Field of Search .................. 342/93, 90, 94, 342/99, 101, 160, 161, 162, 203

[56] References Cited

U.S. PATENT DOCUMENTS

| | | | |
|---|---|---|---|
| 4,005,416 | 1/1977 | Tucker et al. | 342/90 |
| 4,293,856 | 10/1981 | Chressanthis et al. | 342/93 |
| 4,459,592 | 7/1984 | Long | 342/93 |
| 4,503,432 | 3/1985 | Bailey | 342/93 |
| 4,684,950 | 8/1987 | Long | 342/94 |
| 4,713,664 | 12/1987 | Taylor, Jr. | 342/91 |
| 5,485,157 | 1/1996 | Long | 342/160 |
| 5,499,030 | 3/1996 | Wicks et al. | 342/93 |
| 5,539,412 | 7/1996 | Mendelson | 342/192 |
| 5,559,517 | 9/1996 | Didomizio | 342/156 |

*Primary Examiner*—John B. Sotomayor

[57] ABSTRACT

This invention improves the detection performance of doppler radar by censoring clutter at the output of the doppler processor, and it functions in operative association with a range CFAR. By a selective rejection of signals based on doppler characteristics and on signal amplitude, it will reduce the sum of clutter and noise at the input to the CFAR. Thus the CFAR detection threshold level is lowered, which thereby improves the detection performance for moving targets.

20 Claims, 8 Drawing Sheets

DOPPLER RATIO DETECTION RADAR WITH RANGE CFAR

BACKGROUND OF THE INVENTION

This invention relates to methods of and circuits for suppressing clutter and noise for automatic detection radars. It is applicable to pulse doppler and MTI (moving target indication) radars, for which the principles are given in Chap. 4 of *Introduction to Radar Systems*, McGraw-Hill Book Company, 1980, by M. I. Skolnik. Throughout this document the term "doppler radar" refers to either MTI or pulse doppler radar.

Radar clutter signals are unwanted signals caused by radar echo (see, e.g., Skolnik, p. 470), and clutter signal magnitude therefore depends on radar range and direction. Land and sea clutter, being from stationary and slowly moving objects, have relatively small doppler frequencies including frequencies at and near zero. Noise signals, on the other hand, are unwanted signals caused by random fluctuations having wide doppler frequency spectra extending from zero to an upper limit controlled by receiver bandwidth (Skolnik, pp. 23–29). Unlike clutter echo, noise at the radar output occurs at all radar ranges.

Doppler radars are designed to detect radar echoes from moving targets having doppler frequencies appreciably above zero and to suppress signals having doppler frequencies at and near zero. For a stationary radar, the doppler frequency at the input of the doppler filter is zero for stationary clutter received from the earth's surface. Stationary clutter is then suppressed by the doppler processor comprised of a MTI canceler, bandpass filters having passbands not including zero frequency, or a combination thereof.

Because of the relative motion between the antenna and the earth's surface, most doppler radars for aircraft and ships employ motion compensation prior to doppler filtering so that surface clutter received via the antenna's major lobe (main beam) is suppressed. This is accomplished, e.g., by introducing an adaptive doppler frequency offset so that, at the input of the doppler filter, the signals from surface clutter received via the main beam have doppler frequencies at or near zero frequency. Clutter-lock and TACCAR (time-averaged clutter coherent airborne radar) are commonly used techniques to compensate for platform motion.

Radars have phase and amplitude instabilities that cause the signals they process to fluctuate, thereby creating modulation components of non-zero doppler frequency. Then, even when both the radar and the clutter are stationary, the doppler processor output due to said clutter, i.e., clutter residue, is oftentimes stronger than the output signals caused by moving targets of interest. Thus, strong clutter echoes received via an antenna's main beam, i.e., major lobe, are a source of main-beam clutter "burnthrough".

For a moving radar, surface clutter from the earth received via the antenna sidelobes constitutes another source of non-zero doppler frequency clutter. Recall that clutter-lock and TACCAR processing are designed to frequency shift received signals so that the doppler frequency of main beam surface clutter is at zero doppler frequency. However, on a moving platform the doppler frequency of clutter from a surface patch depends on the azimuth and elevation angles between the platform's velocity vector and said patch. Therefore, the doppler frequency after TACCAR and/or clutter-lock processing of surface clutter received via the antenna sidelobes is not zero, and consequently it is generally not suppressed by a doppler processor.

Rotating blades can also generate clutter signals at the output of a doppler processor because moving objects near a radar antenna will modulate the antenna's radiation pattern. Thus, rotating blades can modulate radar received signals, and the doppler frequencies generated are harmonically related to the rotation rate of the blades. Therefore, aircraft propellers and helicopter rotors can shift the doppler frequencies of zero and near zero doppler frequency clutter signals. Then, the clutter doppler frequencies, when shifted, can equal those of moving targets. In this case, the output of a doppler filter will contain clutter signals if a propeller modulation frequency component is within the filter pass band.

Modern automatic detection and tracking radars use an interference thresholding circuit called CFAR (constant false alarm ratio). A CFAR establishes a threshold level at each range cell to automatically reject clutter and noise. Then, a signal of magnitude above the threshold is assumed to be due to a target and one below the threshold is assumed to be caused by either noise or clutter. The most commonly used CFAR is the range CFAR. A range CFAR sets a threshold level in each range cell based on sampling the strength of a radar processed signal in neighboring range cells. To accomplish this, the CFAR obtains an aggregate (usually an average) of the strengths of the radar signal sampled at neighboring range cells, and based on the aggregate's magnitude it sets a threshold. Then for each range cell, a target signal is provided as output if its magnitude exceeds the threshold at said each range cell; otherwise the CFAR output is zero.

The present disclosure teaches radar detection in the presence of three types of clutter; herein called fixed, moving, and propeller clutter. For this document, fixed clutter is defined as clutter at the input to the doppler processor with doppler frequency at and near zero, and it is of course expected to be suppressed by the doppler processor. On the other hand, moving clutter has higher doppler frequencies at the input to the doppler processor and ordinarily it will not be suppressed by the doppler processor. Moving clutter includes both wind-driven rain and clutter from the earth's surface received via a sidelobe of a moving radar. Propeller clutter is caused by clutter signals from the earth's surface that have been shifted in doppler frequency by rotating blades, as described above, and it has doppler frequency equal to that of a moving target. Propeller clutter is therefore doppler frequency sidebands created by modulating surface clutter. Thus, propeller clutter is generated by the presence of radar received clutter of zero and near zero doppler frequency.

U.S. Pat. Nos. 4,459,592 and 4,684,950 teach a ratio comparator for establishing an adaptive clutter threshold level to reject clutter spikes, even though they are very strong. More specifically, a ratio comparator is taught that functions on the basis of the ratio of the amplitudes of two signals: one with magnitude proportional to the radar received signal and which contains doppler frequencies at and near zero and the other with and having doppler frequencies appreciably above zero. According to the definitions given above for fixed, moving, and propeller clutter; the ratio comparator rejects fixed and propeller clutter, but it does not reject moving clutter. The ratio comparator is designed, of course, so as not to reject signals from moving targets.

The subject invention comprises a ratio comparator (RC) and a level sensor (LS) means that function in operative association. Signals of intermediate amplitude or larger if due to fixed or propeller clutter are rejected by the RC-LS combination, Other signals including those from moving targets and moving clutter are not rejected, and are thereby provided as input to a range CFAR. In this way, if fixed or propeller clutter is present at the processor output, the average clutter level at the CFAR input is reduced. Thus the radar detection performance for moving targets is improved.

SUMMARY OF THE INVENTION

The invention is applicable to a doppler radar that uses range CFAR for automatic target detection and for the suppression of clutter and noise. It improves the radar detection performance by censoring clutter that is outputted from a doppler processor, and it functions in operative association with said range CFAR. By a selective rejection on the basis of amplitude of the clutter types referred herein as fixed and propeller clutter, it reduces the sum of clutter plus noise at the input to the CFAR. Thus, the CFAR threshold level is lowered, and this results in an improved detection performance for moving targets.

The objects of the invention are to provide circuits and methods that:

(1) Will provide a method for rejecting fixed clutter signals of intermediate and stronger levels from the input to the range CFAR, thereby improving the radar system's sensitivity for detecting moving targets in clutter.

(2) Will provide a method for rejecting propeller clutter signals of intermediate and stronger levels generated from the input to the range CFAR, thereby improving the radar system's sensitivity for detecting moving targets in clutter.

(3) Will provide a method for the automatic detection of targets in the presence of clutter and noise comprising a combination of thresholders that function in operative association, including a ratio comparator and a level sensor means, for rejecting clutter signals from the input of the range CFAR.

(4) Can be used with a MTI or a pulse doppler radar which uses MTI cancelers that process either unipolar video or bipolar video (either single signal or I and Q signals) signals.

(5) can be used with a MTI or a pulse doppler radar that uses a plurality of doppler filters.

(6) Can be used with a MTI or a pulse doppler radar which uses a MTI canceler and a plurality of doppler filters.

To accomplish these objects, the invention which is called selective doppler ratio thresholder (SDRT) suppresses signals of the types referred herein as fixed and propeller clutter, and it thereby reduces the total clutter plus noise level at the input to said CFAR. The SDRT comprises a ratio comparator and a level sensor means. The ratio comparator, taught in U.S. Pat. Nos. 4,459,592 and 4,684,950, rejects the fixed and propeller clutter on the basis of the ratio of the magnitudes of two signals that are processed through channels having different doppler frequency transmission characteristics. The level sensor means provides a level sensor output signal having magnitude of a first level at each of a plurality of range cells where the magnitude of the level sensor output signal that indicates whether or not at a given range cell the magnitude of the level sensor input signal, which varies in response to the radar received signal, exceeds an intermediate level relative to the magnitudes of the level sensor input signal at neighboring range cells.

By functioning in operative association with a level sensor means, the ratio comparator is activated to allow a signal at the output of a doppler processor to be a candidate for rejection only at a range cell where the level sensor input signal is of intermediate level or larger relative to its strength in neighboring range cells. Thus, this selective activation (1) permits the ratio comparator to reject the larger and more troublesome signals if due to fixed and propeller clutter and (2) limits the reduction in the CFAR threshold level that might otherwise be caused by ratio-comparator rejected (zero amplitude) signals at a large fraction of the range cells within the window or windows of range sampled by the CFAR. It is now underscored that, in addition to activating the ratio comparator for rejecting the larger signals if due to fixed and propeller clutter, the level sensor limits the amount of reduction in the CFAR threshold level (caused by fixed and propeller clutter being rejected at its input) which enables the CFAR to reject noise and moving clutter. Thus, as a consequence of the selective yet limiting features of the ratio comparator and level sensor functioning in operative association, the CFAR can reject the noise and clutter at its input even though its threshold level is substantially lowered. This lowered threshold level can thereby improve the radar performance for detecting targets in the presence of clutter and noise.

DETAILED DESCRIPTION OF THE PREFERRED EMBODIMENTS

Figure 7:
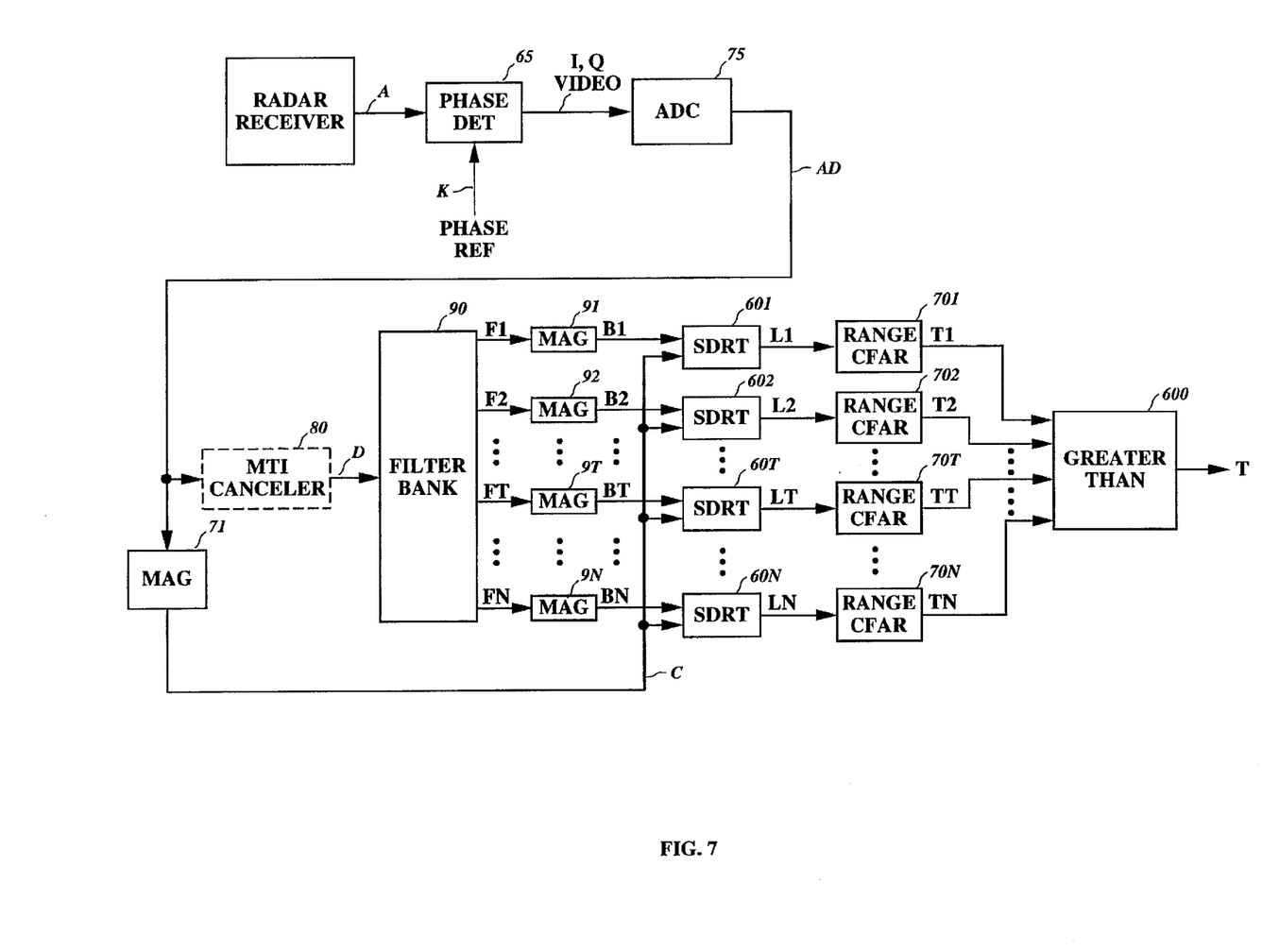
FIG. 7 is a block diagram that illustrates the radar detection system when processing the output signals from a plurality of doppler filters.

Embodiments of this invention can be implemented with either analog or digital circuitry, or with a computer and software. FIG. 7 includes a phase detector, block 65, for generating I and Q video signals, and an analog-to-digital converter, block 75. Also, for the purpose of simplifying the drawings and thereby clarifying key features basic to the invention, only one channel, i.e., I (in-phase) or Q (quadrature-phase) is shown. Readers familiar with the signal processing art will recognize that neither block 65 nor block 75 is necessary. In practise, radar doppler processors process either unipolar video or bipolar video signals; wherein the bipolar signals may be either a single signal or both an I and a Q signal. In addition, a doppler processor may comprise only a MTI canceler, a plurality of doppler filters, or a MTI canceler and a plurality of filters.

Most modern signal processors process the I and Q video separately after digitizing with an analog-to-digital converter, and then appropriately recombine the processed digital I and Q signals for obtaining signal magnitude. The digital filtering frequently employs computations using a Digital Fourier Transform (DFT), and for providing a filter having many filters the Fast Fourier Transform (FFT) is often preferred because of its computational efficiency (G. W. Stimson, *Introduction to Airborne Radar*, Hughes Aircraft Company, El Segundo, Calif., 1983, Chaps. 19 and 20. It is to be understood, therefore, that all of the system embodiments of this disclosure can employ digital signal processing.

Figure 1:
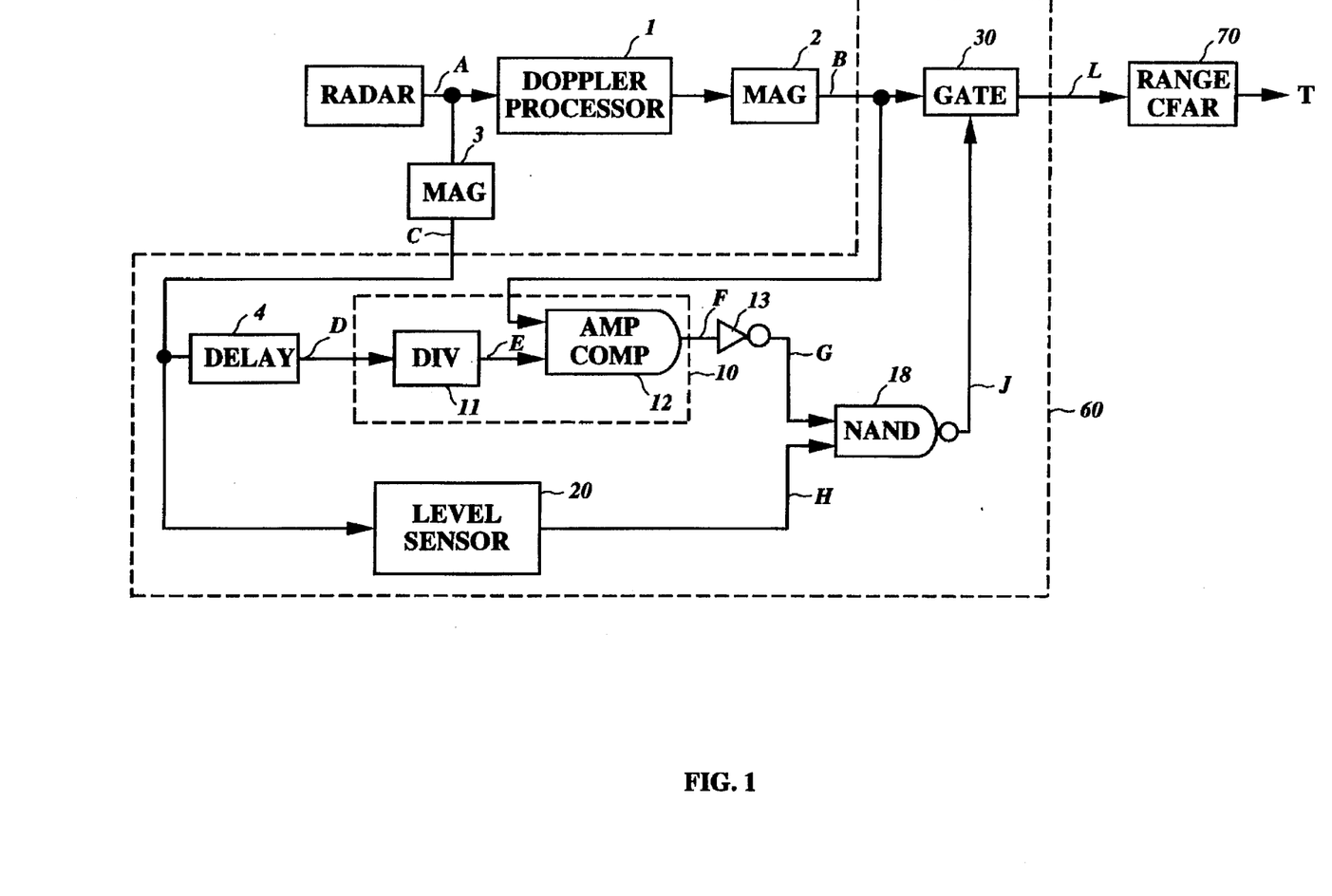
FIG. 1 is a block diagram that illustrates principal features of the radar detection system in accordance with the present invention.

FIG. 1 illustrates the principal features of the invention. A radar receiver provides received signal A which is filtered by the doppler processor, block 1, and is processed by magnitude detector, block 2, to provide a doppler filtered unipolar signal B. Signal A is also processed by magnitude detector 3 to provide unipolar signal C. It is to be noted that (1) signal C is responsive to the magnitude of signal A, and (2) signal B is responsive to the magnitude of signal A because it is obtained from signal A after being doppler filtered by doppler processor 1. Both signals B and C are supplied as input to block 60 which is called a selective doppler ratio thresholder (SDRT). The SDRT, block 60, is placed between the doppler processor, block 1, and the range CFAR, block 70, from which radar output is obtained.

It is to be underscored here that the block diagrams of this disclosure are simplified for clarity. To illustrate, the signal processing practice of compensating for relative signal delays with delay lines or alternative means usually will be necessary. For example, the basic invention simultaneous compares signals within the same radar range cell obtained via separate channels that employ components that have different transit times. Therefore delay lines can be useful to equalize the transit times between channels. For example, in FIG. 1 the channels used to supply the two signals to amplitude comparator 12 in block 10 are comprised of different components: each includes a magnitude detector but one includes a doppler processor; and the other includes a divider. Since the transit times of the two above-mentioned channels will be different, a delay line such as block 4 can be used to equalize the transit times of the two channels.

The SDRT, block 60, of FIG. 1 is comprised of a ratio comparator, block 10, and a level sensor, block 20. As already addressed, block 4 simply provides a time delay to signal C for providing signal D, and thus the magnitude of signal D varies in response to the magnitude of received signal A. Greater detail on blocks 10 and 20 is given in the material that follows. However, ratio comparator block 10 provides an output signal F only at range cells for which the ratio of signal B to signal D exceeds a predetermined value, and therefore signal G at the output of inverter 13 is present only at range cells for which the ratio of signal B to signal D is less than a predetermined value. The level sensor, block 20, provides a level sensor output signal H only at those range cells where signal C exceeds an intermediate level of the values of signal C that exist within a window or windows of neighboring range cells. Therefore, since signals G and H are input to NAND gate 18, signal J is output at a range cell except when signals G and H are both present. Thus, since signal J activates gate 30 for passing signal B as gate output signal L, signal L is input to the range CFAR, block 70, except at range cells where the following two conditions simultaneously exist: (1) the ratio of signal B to signal D is less than a predetermined value and (2) signal C exceeds an intermediate level of the values of signal C that exist within a window or windows of neighboring ranges. Consequently, signal L, the selective doppler ratio thresholder output signal, constitutes a fixed and propeller clutter suppressed radar output. Furthermore, signal L is processed by range CFAR block 70 and its output is signal T, a clutter and noise suppressed radar output.

Ratio comparator, block 10, is a ratio comparator means that follows applicant's teachings in U.S. Pat. Nos. 4,459, 592 and 4,684,950. It compares signals B and D within each radar range cell and provides a ratio comparator output signal F only when the ratio of signal B to signal D exceeds a predetermined value. This predetermined ratio is established by the attenuation of signal D caused by divider 11, a level adjuster, which results in the creation of signal E. Specifically, signal F is output from amplitude comparator 12 if signal B exceeds signal E; where signal E is obtained by attenuating signal D with a level adjuster, namely, divider 11.

Figure 2:
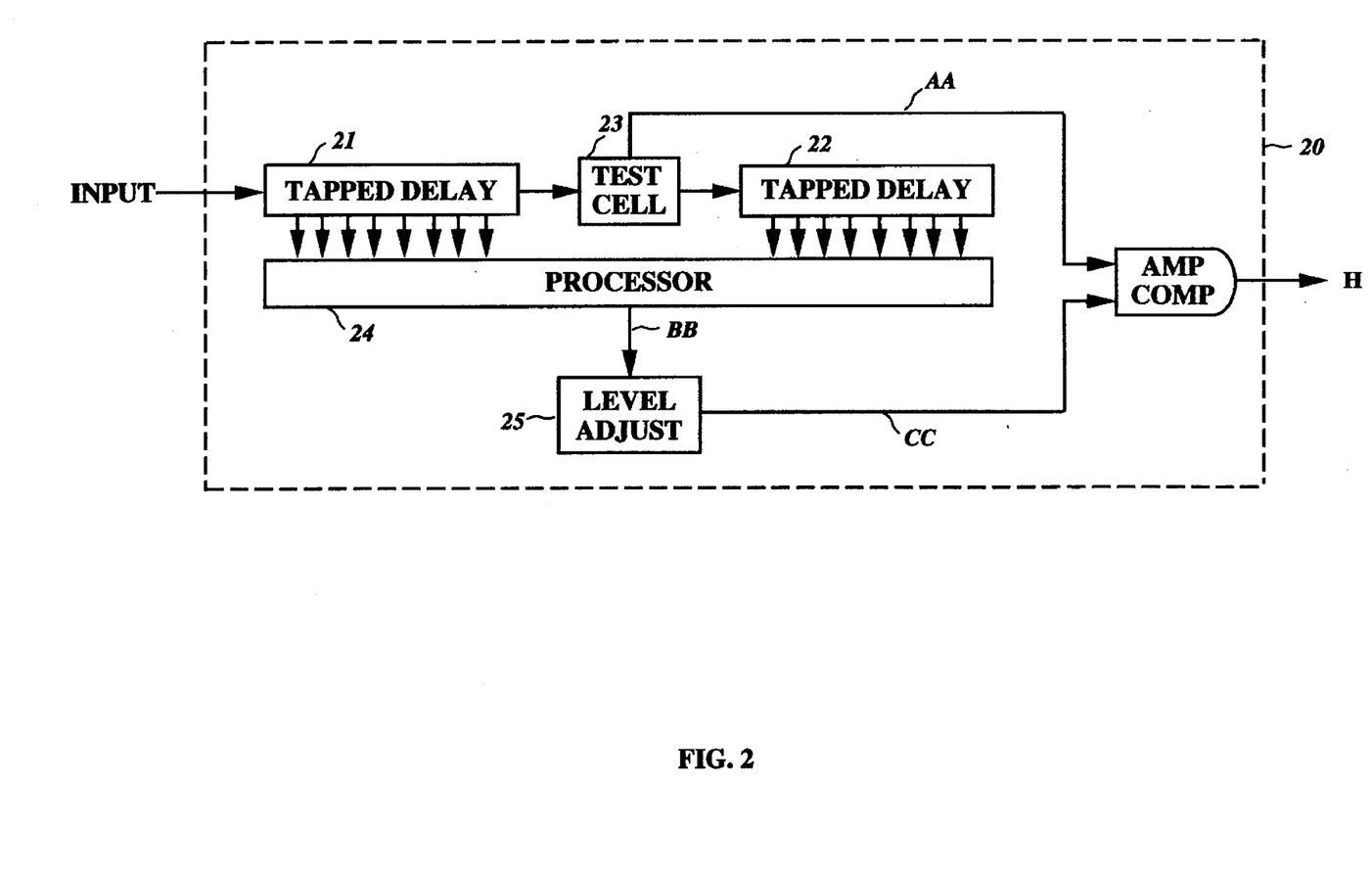
FIG. 2 is a block diagram of a level sensor.

FIG. 2 illustrates a level sensor which utilizes tapped delay lines, blocks 21 and 22. Following conventional practise (see, e.g., Skolnik, p. 393), these delay lines are used to sample the level sensor input signal at range cells on either side of each range cell of interest by means of the test cell, block 23. This test cell provides signal AA as output and, in accordance with conventional range CFAR techniques, it can be positioned in range over the plurality of ranges corresponding to the instrumented radar range. Spacing between the taps is equal to the separation of range cells, i.e., the range resolution, and the outputs of the taps are processed by the processor, block 24, to obtain an aggregate, signal BB. The aggregate when multiplied by the level adjuster, block 25, provides level sensor reference signal CC. Then, level sensor output signal H is provided only at a test range cell where level sensor AA exceeds the level sensor reference signal CC; said reference signal magnitude at a range cell being of intermediate value between the smallest and largest magnitudes of the level sensor input signal at the neighboring range cells within the windows of ranges sampled by delay lines 21 and 22.

Figure 3:
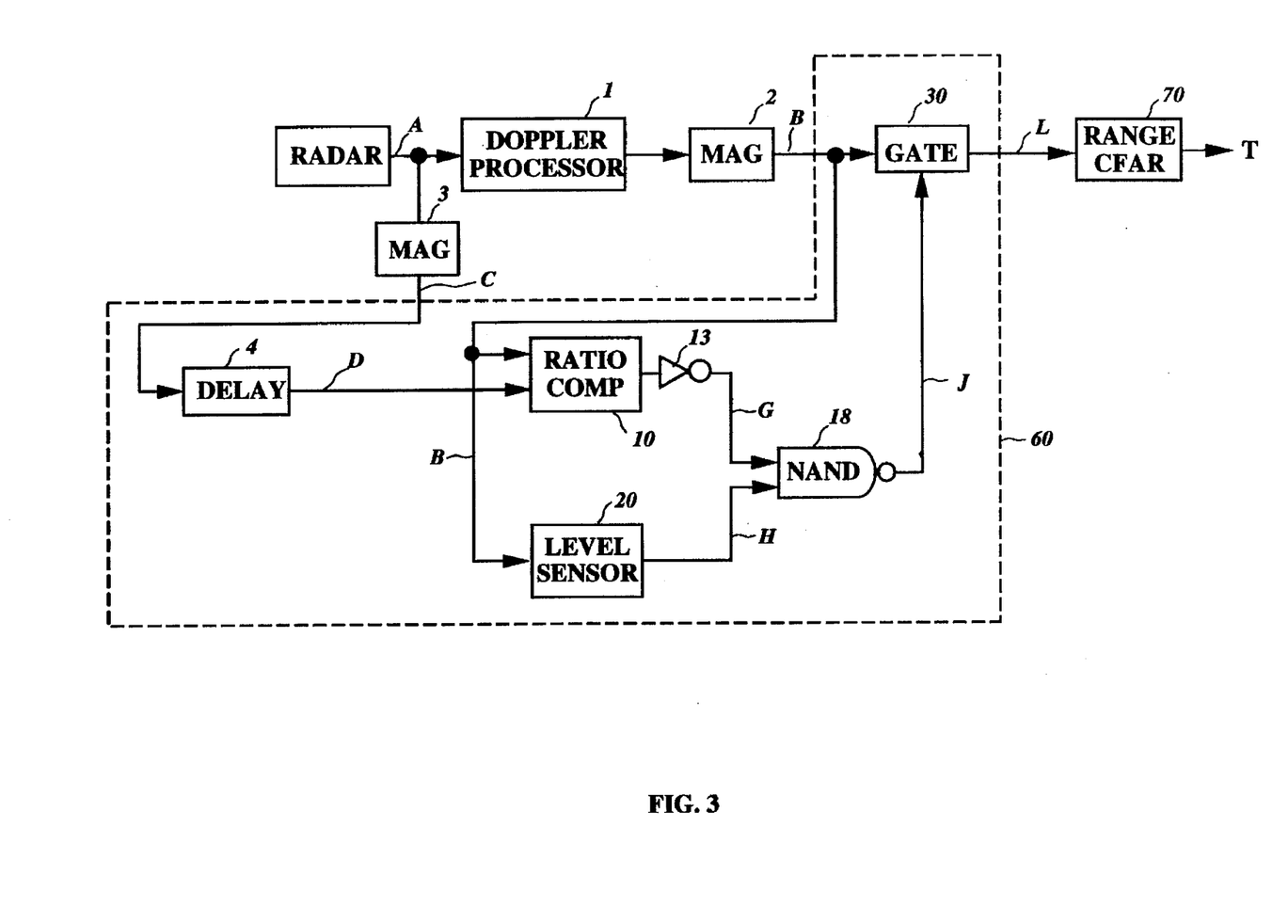
FIG. 3 is a block diagram of an alternate embodiment that illustrates principal features of the radar detection system in accordance with the present invention.

FIG. 3 shows a selective doppler ratio thresholder, block 60, wherein as in FIG. 1 its inputs are signals B and C, and its output signal L is supplied as input to range CFAR 70. Also like FIG. 1, block 60 is comprised of a ratio comparator (block 10), and a level sensor (block 20). FIG. 3 differs from FIG. 1, however, in that its block 60 provides its output signal L based on the level sensor 20 sampling the strength of signal B (instead of signal C) over range cells within its window or windows of sampling ranges. Thus since signals G and H are input to NAND gate 18, the selective doppler ratio thresholder output signal L is output from block 60 except at range cells where the following two conditions simultaneously exist: (1) the ratio of signal B to signal D is less than a predetermined value and (2) signal B (the level sensor input signal) exceeds an intermediate level of the values of signal B that exist within a window or windows of ranges.

Figure 4:
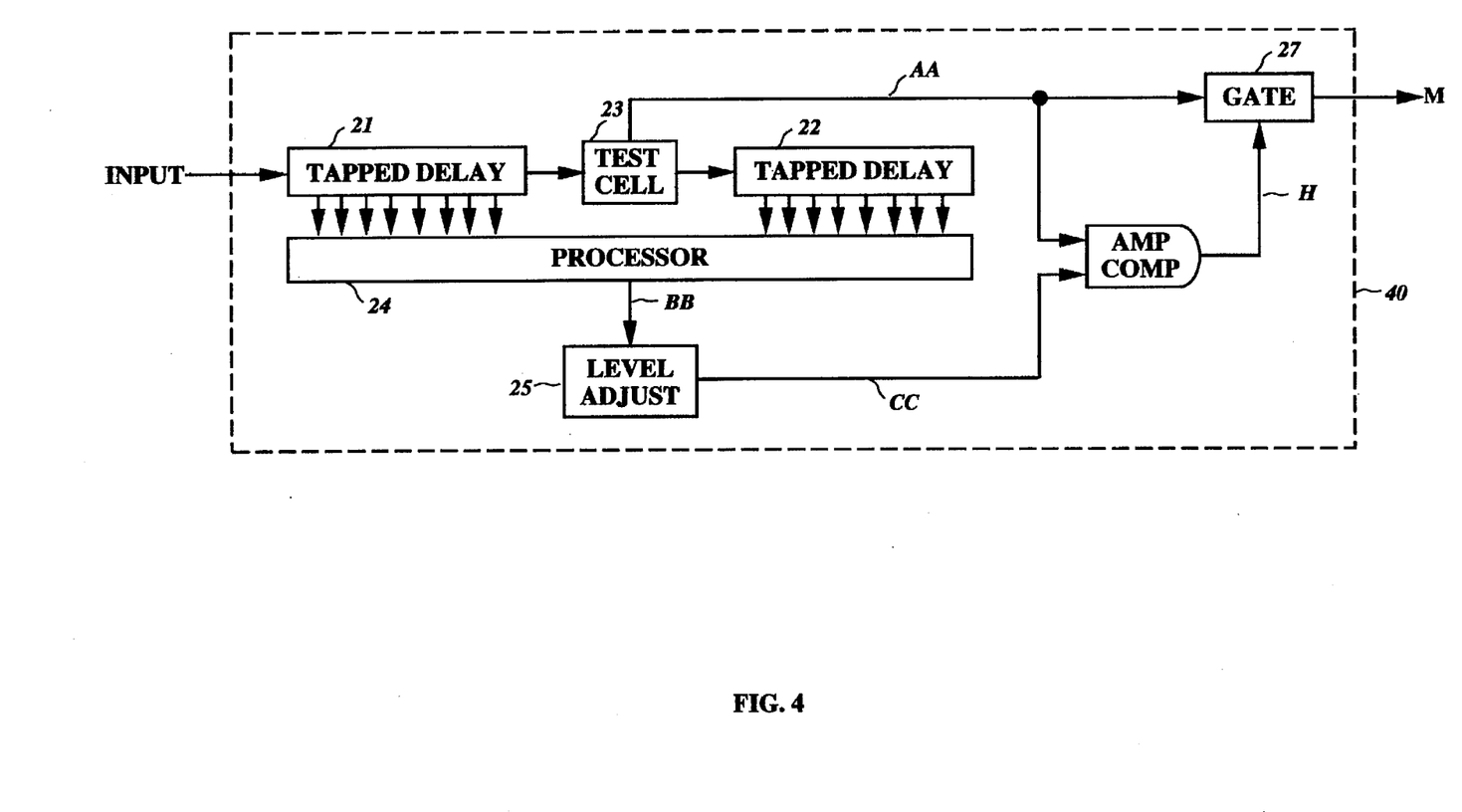
FIG. 4 is a block diagram of a range CFAR.

FIG. 4 illustrates a range CFAR, block 40, which utilizes tapped delay lines, blocks 21 and 22. It is to be noted that FIG. 4 differs from FIG. 2 only in that signal H, instead of being output, is used to activate gate 27 for providing signal M as output. Thus it should be apparent that a range CFAR can be used as a level sensor means; because for the same magnitude of signal CC (FIGS. 2 and 4), signal M of FIG. 4 will be activated at the same ranges as will signal H of FIG. 2. However, it is to be noted that when a range CFAR is used as a level sensor according to the present invention, the level adjuster (block 25) should be set so that the threshold level (signal CC) is much smaller than is appropriate for functioning in the conventional CFAR role. More specifically, without the presence of targets, the output (signal H of FIG. 2 and signal M of FIG. 4) for a level sensor means should occur at less than, roughly, half of the range cells; thus occurring at range cells where the sum of clutter plus noise is at least of intermediate and larger levels with respect to the signals in neighboring range cells.

Figure 5:
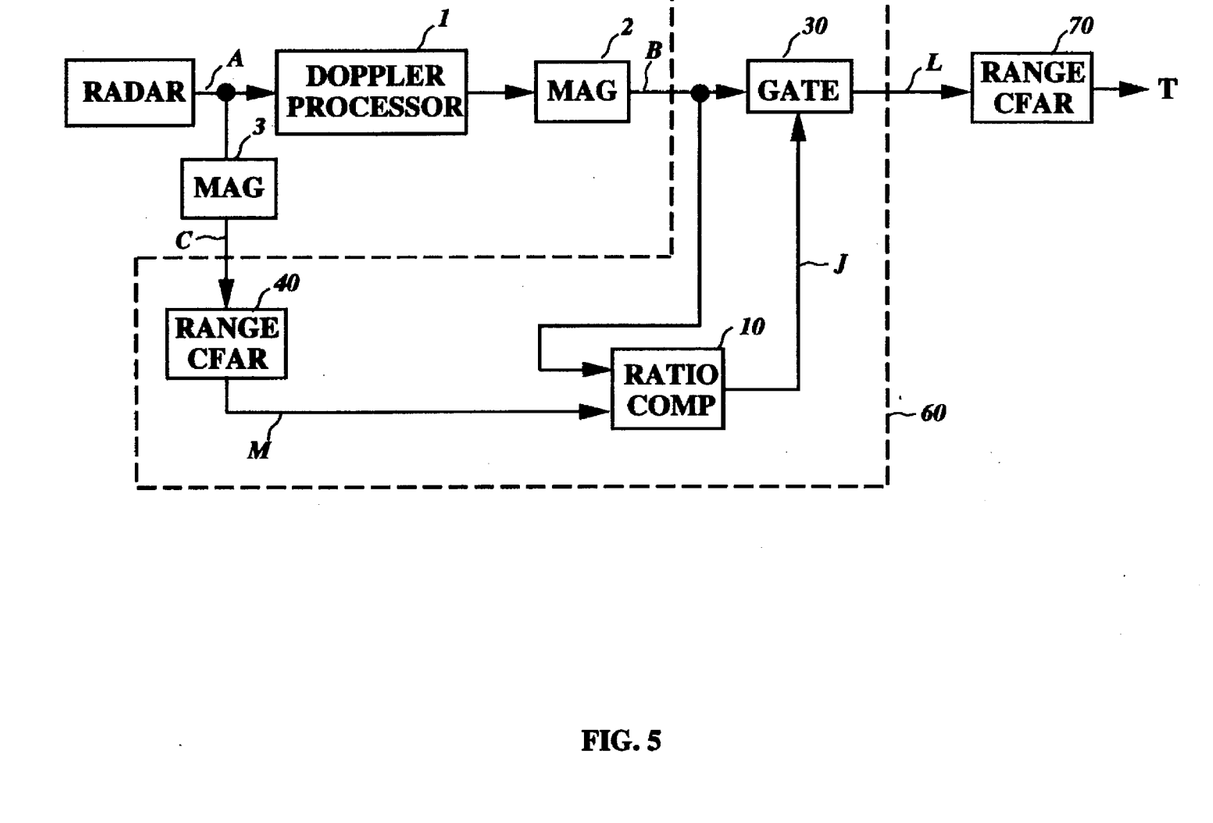
FIG. 5 is a block diagram of an embodiment of the radar detection system in accordance with the present invention that employs a range CFAR to function as a level sensor.
Figure 6:
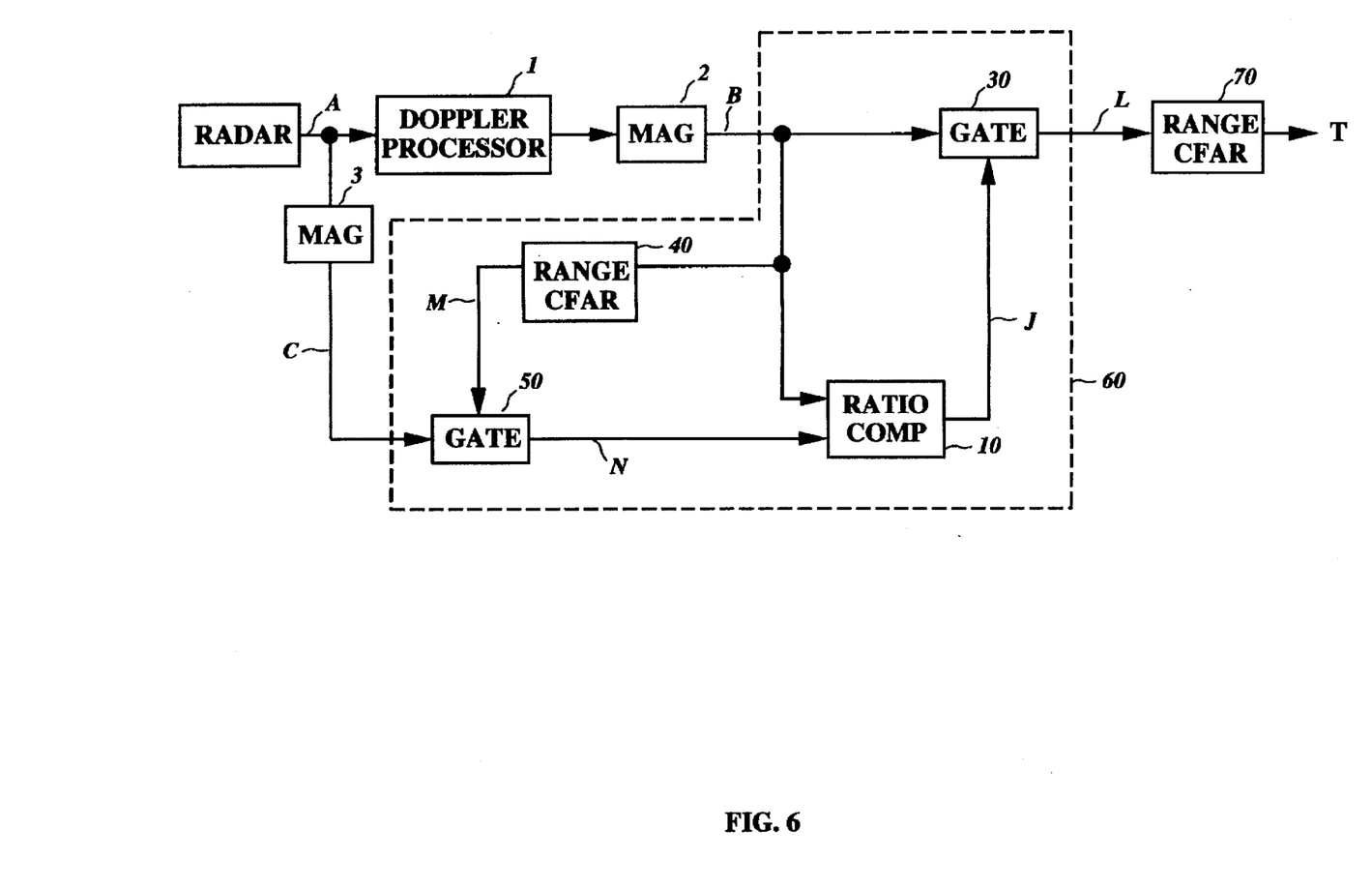
FIG. 6 is a block diagram of an alternate embodiment of the radar detection system in accordance with the present invention that employs a range CFAR to function as a level sensor.

FIGS. 5 and 6 each show a range CFAR (blocks 40) employed as a level sensor. In FIG. 5, the output of ratio comparator 10 activates gate 30 which thereby outputs signal L at range cells where signal B exceeds signal M. Note that signal M is zero except at range cells where signal C exceeds the threshold of CFAR 40. Therefore, selective doppler ratio thresholder (SDRT) output signal L is provided as output except at those range cells where both signal C exceeds the CFAR 40 threshold (thereby causing signal M to equal signal C) and the ratio of signal B to signal C is less than a predetermined value.

In FIG. 6, the output of ratio comparator 10 activates gate 30 which thereby provides SDRT output signal L at those range cells where signal B exceeds signal N. Furthermore, signal N is zero if gate 50 is not activated by output signal M of range CFAR 40 which occurs only where signal B exceeds the threshold of CFAR 40. Also if signal N is non-zero it equals signal C. Therefore, signal L is provided as output except at those range cells where both signal B exceeds the threshold of range CFAR 40 and the ratio of signal B to signal C is less than a predetermined value.

Figure 8:
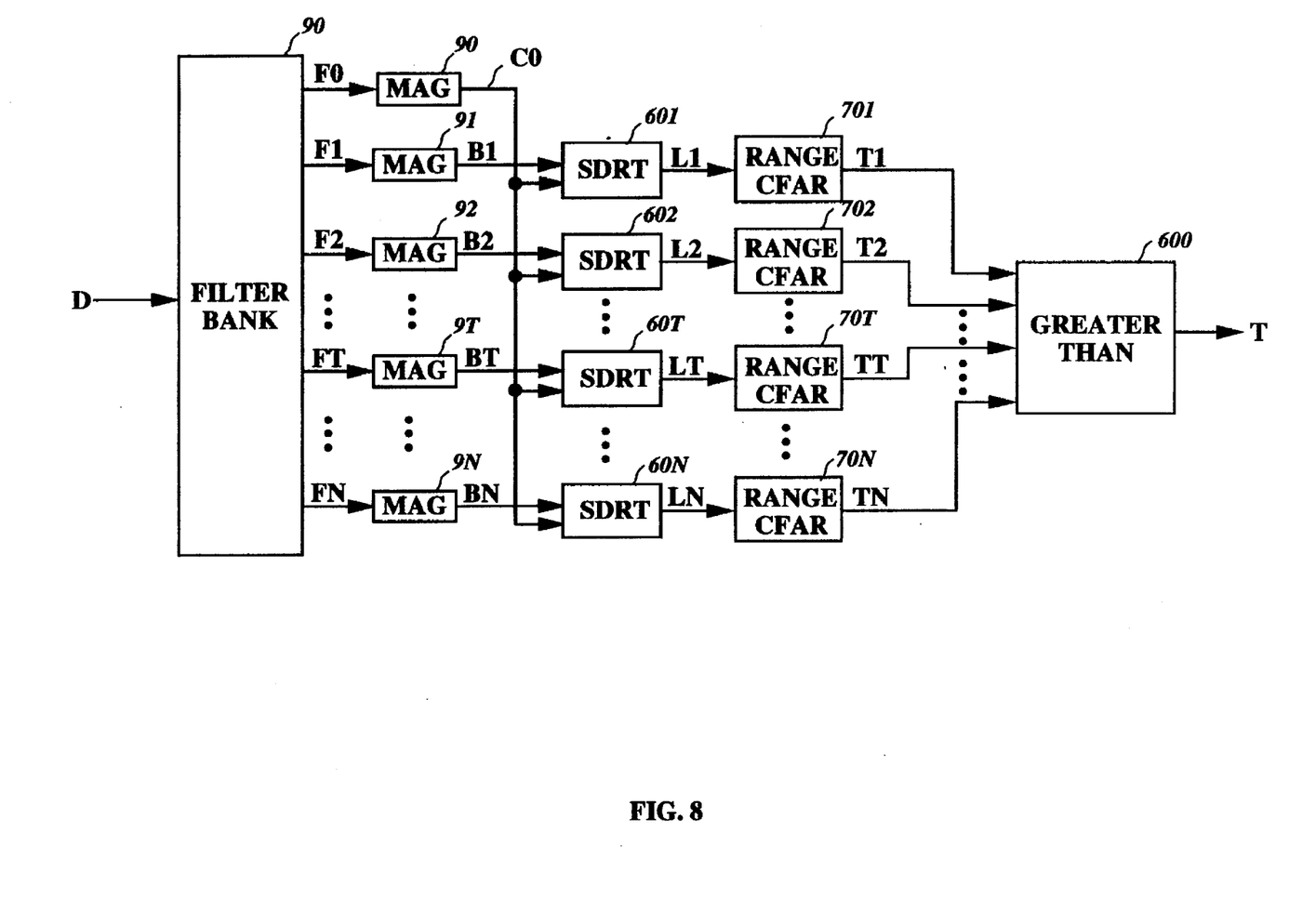
FIG. 8 is an alternate block diagram that illustrates the radar detection system when processing the output signals from a plurality of doppler filters.

FIGS. 1, 3, 5 and 6 each include one selective doppler ratio thresholder (SDRT), but FIGS. 7 and 8 each illustrate the use of a plurality of SDRTs. In FIGS. 7 and 8, blocks 601 through 60N are SDRTs and each is connected for processing an output of a filter bank 90. In each case, signals of magnitude B1 through BN are obtained from signal channels with center frequencies F1 through FN by means of magnitude detectors 91 through 9N. These signals of magnitudes B1 through BN are input to SDRTs 601 through 60N having output signals L1 through LN that are input to range CFARs 701 through 70N. Thus, outputs of a filter bank 90 are separately processed and the resulting processed outputs are T1 through TN, respectively. Then, a single clutter suppressed output T is obtained from the output of greater-than-circuit 600 which is obtained by comparing the individual channel output signals T1 through TN.

In FIG. 7 signal C is obtained from magnitude detector 71 for providing a signal in response to the magnitude of the received signal A. In FIG. 8 signal C0 is provided instead of signal C, and it is obtained differently. In this case, signal C0 is derived from signal F0, an output of filter bank 90 that passes a band of doppler frequencies that includes zero frequency. Thus signal C0 is ordinarily dominated by fixed and slowly moving clutter, as is signal C of FIGS. 1, 3, 5, 6 and 7.

It should now be apparent that signal C0 of FIG. 8, like signal C of FIG. 7, provides an input signal needed for a ratio comparator; namely, a signal with amplitude proportional to the radar received signal after either some or no doppler filtering and which contains doppler frequencies at and near zero. Signals B1, B2, BT, and BN of FIGS. 7 and 8 each provide the second signal needed as input to the ratio comparators within SDRTs 601, 602, 60T, and 60N, respectively. An advantage of signal C0 in FIG. 8 over signal C in FIG. 7 for supplying a signal containing doppler frequencies at and near zero is that signal F0 is usually readily available along with signals F1 through FN from a Fast Fourier Transform (FFT) or other algorithm being used as the digital filter that serves as the filter bank.

The operating characteristics of the SDRTs, blocks 601 through 60N, of FIGS. 7 and 8 are the same as those denoted as block 60 in FIGS. 1, 3, 5, and 6. Therefore, any of the block 60 configurations can be used for providing the SDRTs of FIGS. 7 and 8. Clearly, the signals B1 through BN of FIGS. 7 and 8 are each input to their respective SDRT like signal B is input to the block 60 configurations of FIGS. 1, 3, 5, and 6. Furthermore, signal C and signal C0 of FIGS. 7 and 8, respectively, are each input to the SDRT blocks 601 through 60N like signal C is input to the block 60 configurations of FIGS. 1, 3, 5, and 6.

The MTI canceler, block 80, in FIG. 7 is drawn with dashed lines to indicate that its use is optional. In other words, the invention is applicable to a doppler radar that employs a plurality of doppler filters either with or without a MTI canceler.

The reader will recall that propeller clutter has specific doppler frequencies, i.e., harmonics of the blade rotation rate. Thus, the embodiments of FIGS. 7 and 8 are especially attractive for rejecting this clutter type. Assume that strong ground clutter exists at the radar input and assume signal BT is dominated by propeller clutter resulting from the strong input clutter, which will be of zero or near zero doppler frequency. Now assume that divider 11 within the ratio comparator 10 (see FIG. 1) of SDRT 60T (FIGS. 7 and 8) is set for a predetermined ratio slightly larger than the ratios of signal BT to signal C (FIG. 7) and of signal BT to signal C0 (FIG. 8). Such a predetermined ratio is required to reject signal LT. Then, of course, the signals BT of FIGS. 7 and 8 at a given range cell will be rejected if due to propeller clutter and if of sufficient amplitude relative to signals in neighboring range cells. On the other hand, signal LT will be output for most range cells with target present, because the ratios BT/C and BT/C0 will usually be larger than the above assumed predetermined ratio. Thus, a propeller clutter signal BT if sufficiently strong will be rejected, but in most range cells signal BT will not be rejected if due to a target.

From experience it is known that the strength of propeller clutter depends on the pointing direction of the radar antenna, with the maximum propeller clutter occurring when the antenna points at the rotating blades. Therefore, a SDRT circuit that maximizes target detection sensitivity as a function of antenna look direction can be implemented by programming the attenuation provided by divider 11 (FIG. 1) so that it varies as a function of antenna look direction, with minimum attenuation occurring when the antenna is pointed toward the rotating blades.

The doppler processors of FIGS. 1, 3, 5, and 6 each contain one output for detecting moving targets, and each output is labeled signal B after being output from a magnitude detector. FIGS. 7 and 8 each include processors that have multiple outputs for detecting moving targets, and are labeled B1 through BN after each is output from a magnitude detector. To detect moving targets and to suppress clutter and noise, each of the doppler processor channels from which the above named target channel signals (B, and B1 through BN) are obtained includes a filtering means that passes doppler frequencies appreciably above zero and suppresses doppler frequencies at and near zero.

It is also to be noted that each of the target channel signals (B, and B1 through BN) is processed by a selective doppler ratio thresholder (SDRT) for providing a SDRT output signal as an input signal to a range CFAR. One other signal is provided as input to each SDRT: it is labeled as signal C in FIGS. 1, 3, 5, 6, and 7; and labeled as signal C0 in FIG. 8.

Signal C in FIGS. 1, 3, 5, 6, and 7 is obtained from the output of a radar receiver after magnitude detection and without being doppler processed. Then, signal C varies in proportion to the radar received signal and when dominated by fixed clutter, signal C is principally of zero and near zero doppler frequency. In FIG. 8 signal C0 is obtained, after magnitude detection, from the output of a filtering means that passes a band of frequencies that includes zero and near zero doppler frequencies. Thus, signal C and signal C0 each provides an input signal needed for a selective doppler ratio thresholder; namely, a signal with amplitude responsive to the radar received signal and having doppler frequencies at and near zero.

Although the block diagram of FIG. 7 is the only one shown herein that depicts I and Q video signals and analog-to-digital conversion, most modern signal processors employ digital doppler processing. It is to be understood, therefore, that all of the embodiments of this disclosure can be implemented with either analog or digital circuitry, or through use of a computer and software.

As noted in the discussion of FIG. 1, in designing radar detection systems that employ applicant's invention, the signal processing practice of compensating for relative signal delays with delay lines or alternative means usually will be necessary. This is because the invention simultaneous compares signals at the same radar range cell that are obtained via separate channels that employ components that have different transit times. Therefore, delay lines can be useful to equalize the transit times between channels.

The above described embodiments of the doppler detection system, which are illustrated in FIGS. 1–8, may be used in practicing the method of doppler radar detection in accordance with the present invention. The method comprises the steps of providing a received signal having magnitude at a plurality of range cells with doppler frequency components in response to radar echoes; frequency filtering and providing at least one filtered signal in response to the magnitude of said received signal; providing a first signal having doppler frequency at and near zero frequency with magnitude in response to the magnitude of said received signal; providing a second signal having magnitude in response to the magnitude of a filtered signal of said at least one filtered signal in response to the magnitude of said received signal and having doppler frequency appreciably above zero; providing a level sensor input signal having magnitude in response to said received signal; and providing a selective doppler ratio thresholder output signal except at range cells where both the ratio of the second signal magnitude to the first signal magnitude is less than a predetermined value and the magnitude of the level sensor input signal is of at least an intermediate level relative to its magnitudes in neighboring range cells. As previously noted, a predetermined value for the above said ratio can be established by attenuating said first signal.

The method of providing doppler radar detection may include employing a unipolar video signal, a bipolar video signal, an IF signal or a RF signal as the received signal.

The method of providing doppler radar detection may additionally include providing said first signal by frequency filtering for passing a band of frequencies that includes zero doppler frequency.

The method of providing doppler radar detection may additionally include producing the filtered signal by providing bandpass filtering with minimum attenuation for a band of doppler frequencies wherein said band is not centered at zero frequency.

It is understood that the illustrative embodiments discussed above and illustrated in the accompanying drawings have been set out by way of example, not by way of limitation. Numerous other embodiments and variants are possible without departing from the spirit and scope of the invention, its scope being defined by the appended claims.

What is claimed is:

1. A radar detection system for processing at a plurality of range cells a received signal having magnitude from a radar receiver, said detection system having a range CFAR and means for selectively rejecting fixed and propeller clutter signals input to said CFAR, wherein said clutter signals are selected for rejection using both ratio and amplitude sensing means, comprising:

doppler processor means for frequency filtering the received signal and providing at least one filtered signal in response to the magnitude of said received signal;

means of providing a first signal having doppler frequencies at and near zero frequency with magnitude in response to the magnitude of said received signal;

means of providing a second signal with magnitude in response to the magnitude of a filtered signal of said at least one filtered signal in response to the magnitude of said received signal, wherein the second signal providing means passes doppler frequencies appreciably above zero and suppresses doppler frequencies at and near zero;

means of providing a level sensor input signal having magnitude in response to said received signal; and selective doppler ratio threshold means for passing a selective doppler ratio thresholder output signal except at range cells where both the ratio of the second signal magnitude to the first signal magnitude is less than a predetermined value and the magnitude of the level sensor input signal is of at least an intermediate level relative to its magnitudes in neighboring range cells, wherein said selective output signal is a fixed and propeller clutter rejected CFAR input signal.

2. A radar detection system according to claim 1, wherein said means of providing said first signal is comprised of a filtering means for passing a band of frequencies that includes zero doppler frequency.

3. A radar detection system according to claim 1, wherein said means for providing a level sensor input signal provides said level sensor input signal having magnitude in response to said first signal.

4. A radar detection system according to claim 1, wherein said means for providing a level sensor input signal provides said level sensor input signal having magnitude in response to said second signal.

5. A radar detection system according to claim 1, wherein said selective doppler ratio thresholder means comprises ratio comparator means for comparing said first and said second signals and for providing a ratio comparator output signal of a first level only when the ratio of the second signal magnitude to the first signal magnitude is less than a predetermined value and of a second level whenever this ratio exceeds the predetermined value, and said predetermined value is established by attenuating said first signal.

6. A radar detection system according to claim 1, wherein said selective doppler ratio thresholder means comprises a level sensor means for providing a level sensor reference signal having magnitude at an intermediate level relative to the magnitudes of said level sensor input signal in neighboring range cells.

7. A radar detection system according to claim 6, wherein said level sensor means provides a level sensor output signal having magnitude of a first level at each of said plurality of range cells where the magnitude of the level sensor input signal is of an intermediate level or smaller relative to its magnitudes in neighboring range cells and of a second level at each of said plurality of range cells where the magnitude of the input signal exceeds said intermediate level.

8. A radar detection system according to claim 6, wherein said level sensor means is comprised of a range CFAR means having an output signal that functions as said level sensor output signal.

9. A radar detection system according to claim 1 comprised of a range CFAR means for processing the selective doppler ratio thresholder output signal and providing for the automatic detection of targets and the suppression of clutter and noise.

10. A radar detection system according to claim 1, wherein said doppler processor means is comprised of at least one bandpass filter.

11. A radar detection system according to claim 1, wherein said doppler processor means employs a Digital Fourier Transform algorithm.

12. A radar detection system according to claim 5, wherein said ratio comparator means comprises level changer means having attenuation programmed to vary as a function of antenna look direction.

13. A radar detection system processing at a plurality of range cells a received signal having magnitude from a radar receiver, said detection system having a range CFAR and means for selectively rejecting fixed and propeller clutter signals input to said CFAR, wherein said clutter signals are selected for rejection using both ratio and amplitude sensing means, comprising:

doppler processor means for frequency filtering the received signal and providing at least one filtered signal in response to the magnitude of said received signal, wherein the doppler processor employs a Digital Fourier Transform algorithm;

means of providing a first signal having doppler frequencies at and near zero frequency with magnitude in response to the magnitude of said received signal;

means of providing a second signal with magnitude in response to the magnitude of a filtered signal of said at least one filtered signal in response to the magnitude of said received signal, wherein the second signal providing means passes doppler frequencies appreciably above zero and suppresses doppler frequencies at and near zero;

ratio comparator means for comparing said first and said second signals and for providing a ratio comparator output signal of a first level only when the ratio of the second signal magnitude to the first signal magnitude is less than a predetermined value and of a second level whenever this ratio exceeds the predetermined value;

means of providing a level sensor input signal having magnitude in response to said received signal;

level sensor means providing a level sensor output signal having magnitude of a first level at each of said plurality of range cells where the magnitude of the level sensor input signal is of an intermediate level or smaller relative to its magnitudes in neighboring range cells and of a second level at each of said plurality of range cells where the magnitude of the input signal exceeds the intermediate level;

selective doppler ratio thresholder means for passing a selective doppler ratio thresholder output signal except at range cells where both the ratio comparator output signal is of said first level and the level sensor output signal is of said second level, wherein said selective output signal is a fixed and propeller clutter rejected CFAR input signal; and range CFAR means for processing the selective doppler ratio thresholder output signal and providing for the automatic detection of targets and the suppression of clutter and noise.

14. A method for setting the detection threshold level of a doppler radar that includes sampling the amplitude level of the output signal of said radar at a plurality of range cells wherein, prior to said sampling, signals from fixed and propeller clutter within said plurality of range cells are selectively rejected on the basis of both amplitude and ratio; comprising the steps of:

providing a received signal having magnitude at a plurality of range cells with doppler frequency components in response to radar echoes;

frequency filtering for suppressing doppler frequencies at and near zero and providing at least one filtered signal in response to the magnitude of said received signal;

providing a first signal having doppler frequencies at and near zero frequency with magnitude in response to the magnitude of said received signal;

providing a second signal having magnitude in response to the magnitude of a filtered signal of said at least one filtered signal in response to the magnitude of said received signal;

providing a level sensor input signal having magnitude in response to said received signal;

providing a selective doppler ratio thresholder output signal except at range cells where both the ratio of the second signal magnitude to the first signal magnitude is less than a predetermined value and the magnitude of the level sensor input signal is of at least an intermediate level relative to its magnitudes in neighboring range cells, wherein said thresholder output signal is a fixed and propeller clutter rejected radar output; and sampling said fixed and clutter rejected output at a plurality of range cells for setting said detection threshold level.

15. A method of doppler radar detection according to claim 14; wherein the step of providing said first signal includes frequency filtering for passing a band of frequencies that includes zero doppler frequency.

16. A method of doppler radar detection according to claim 14; wherein the step of providing said level sensor input signal of magnitude in response to said received signal includes providing a signal in response to said first signal.

17. A method of doppler radar detection according to claim 14; wherein the step of providing said level sensor input signal of magnitude in response to said received signal includes providing a signal in response to said second signal.

18. A method of doppler radar detection according to claim 14; wherein the step of providing a selective doppler ratio thresholder output signal includes comparing said first and said second signals and providing a ratio comparator output signal of a first level only when the ratio of the second signal magnitude to the first signal magnitude is less than a predetermined value and of a second level whenever this ratio exceeds the predetermined value.

19. A method of doppler radar detection according to claim 18; wherein the step of providing said ratio comparator output signal includes comparing the magnitudes of said second signal and an attenuated signal, said attenuated signal obtained by attenuating said first signal.

20. A method of doppler radar detection according to claim 14; wherein the step of providing a selective doppler ratio thresholder output signal includes providing a level sensor reference signal, said level sensor reference signal obtained at a range cell by sampling said level sensor input signal at neighboring range cells to obtain sampled signals and by aggregating the magnitudes of said sampled signals.

* * * * *